United States Patent [19]

Martin et al.

[11] Patent Number: 4,697,307
[45] Date of Patent: Oct. 6, 1987

[54] CHICKEN THIGH SKINNER

[75] Inventors: Eugene G. Martin, New Holland; Harold C. Martin, Lancaster, both of Pa.

[73] Assignee: Favorite Manufacturing, Inc., New Holland, Pa.

[21] Appl. No.: 821,419

[22] Filed: Jan. 22, 1986

[51] Int. Cl.⁴ .............................................. A22C 21/00
[52] U.S. Cl. .......................................... 17/11; 17/21; 17/50
[58] Field of Search ................................ 17/11, 21, 50

[56] References Cited

U.S. PATENT DOCUMENTS

| | | |
|---|---|---|
| 3,119,144 | 1/1964 | Hill . |
| 3,159,872 | 12/1964 | Hill . |
| 3,579,714 | 5/1971 | Edwards, Sr. . |
| 3,930,282 | 1/1976 | Martin et al. . |
| 3,930,283 | 1/1976 | Martin . |
| 4,041,572 | 8/1977 | Martin et al. . |
| 4,073,040 | 2/1978 | Hill . |
| 4,183,117 | 1/1980 | Meyn . |
| 4,270,243 | 6/1981 | Lewis . |
| 4,395,795 | 8/1983 | Hazenbroek . |
| 4,459,721 | 7/1984 | Hill .................................... 17/21 X |
| 4,570,294 | 2/1986 | Meyn .................................... 17/11 |

Primary Examiner—Willie G. Abercrombie
Attorney, Agent, or Firm—Price, Heneveld, Cooper, DeWitt & Litton

[57] ABSTRACT

A chicken thigh skinner includes a table having a feed end and a discharge end. A skinning portion of the table is adjustable along the longitudinal axis of the table to accommodate different size poultry parts. The skinning portion defines an elongated slot which is generally Y-shaped in plan. The arms of the Y define a generally triangular-shaped spear. A pair of counter-rotating spiral cut skinning rolls extend along and parallel to the longitudinal axis of the table. The skinning rolls define a nip which is positioned below the slot of the skinning portion of the table. A conveyor is supported by the table above the nip of the skinning rolls and the slot of the skinning portion of the table.

25 Claims, 9 Drawing Figures

CHICKEN THIGH SKINNER

BACKGROUND OF THE INVENTION

The present invention relates to poultry processing apparatus and more particularly to a unique apparatus for removing the skin from poultry pieces such as chicken thighs.

Various automatic poultry processing machines have been developed to increase productivity. With such equipment, chicken carcasses, for example, may be separated into their component parts. These parts may then be subjected to further processing operations, such as skin removal, deboning and finally packaging. Examples of poultry processing equipment may be found in U.S. Pat. No. 4,016,624 entitled "POULTRY CUT-UP MACHINE" and issued on Apr. 12, 1977, to Martin et al; and U.S. Pat. No. 4,385,421 entitled "POULTRY LEG/BACK PROCESSOR" and issued on May 31, 1983, to Martin.

A typical skinning device includes a pair or set of elongated, counter-rotating rollers. The rollers have an intermeshing, spiral or helical-cut configuration. A conveyor moves the poultry part along and in engagement with the rollers. The rollers engage the skin and tear or pull the skin from the part. Examples of such devices may be found in U.S. Pat. No. 3,119,144 entitled "POULTRY GIZZARD PEELING ROLLS" and issued on Jan. 28, 1964, to Hill; and U.S. Pat. No. 3,930,283 entitled "MACHINE FOR REMOVING SKIN FROM PIECES OF POULTRY" and issued on Jan. 6, 1976, to Martin. This latter patent discloses several embodiments for processing various poultry parts. In one embodiment, poultry necks are processed. A disc knife intersects a channel formed between upper portions of a pair of rollers. The disc knife slits the skin of the necks of the poultry. The rollers have intermeshing spiral configurations which engage the skin and pull the skin from the neck. In another embodiment, a chain-type feeder or conveyor engages a thigh or breast part and moves the part so that the skin is held against a pair of spiral rollers. The rollers engage or remove the skin from the part.

Problems have been experienced with the adjustability of automatic skinning machines to accommodate different size poultry parts and which achieve removal of substantially all of the skin from the part. Due to the nature of operation of the skinning rollers, the skin may be torn so that loose pieces remain attached to the part. A need, therefore, exists for a poultry processing machine which is reliable, efficient in use and which results in substantially all skin removal from the poultry part.

SUMMARY OF THE INVENTION

In accordance with the present invention, a unique poultry processing apparatus for removing the skin from poultry parts, such as chicken thighs, is provided. Essentially, the apparatus includes a table, a conveyor supported on the table and extending along a longitudinal axis thereof and skinning means extending along the longitudinal axis in spaced relationship to the conveyor. The table includes an adjustable skinning portion or support plate. The adjustable plate includes an elongated slot which is positioned between the conveyor and the skinning means and along which a poultry part is moved by the conveyor. The elongated slot has an enlarged entry portion and a Y-shaped portion including a pair of angled arms. The Y-shaped portion of the slot defines a spear between the angled arms thereof. The spear has an apex that will remove loose portions of the skin, which are not removed by the skinning means, as a result of the poultry part being moved across the spear.

In a preferred form of the apparatus in accordance with the present invention, the skinning means comprises a pair of counter-rotating helically or spiral cut rollers or gears. Each of the rollers includes a forward, reversed portion having a spiral cut which is directed opposite to the direction of the remaining portion of the rollers. Provision is made for adjusting the relative positioning of the pair of helically cut rollers with respect to each other and for resiliently biasing the rollers towards each other.

The apparatus in accordance with the present invention is adapted to be bolted to the input end of further processing equipment, such as a thigh deboner. The apparatus will automatically transfer the skinned thigh part to the deboner. The apparatus effectively removes the skin from a poultry piece or part without damage to the meat and without excess removal of meat during the skinning operation. The skinning portion of a support table limits the extent of contact between the helically cut rolls and the poultry piece. The contact is limited to areas immediately adjacent the nip defined by the counter-rotating rollers.

DETAILED DESCRIPTION OF THE PREFERRED EMBODIMENT

Figure 1:
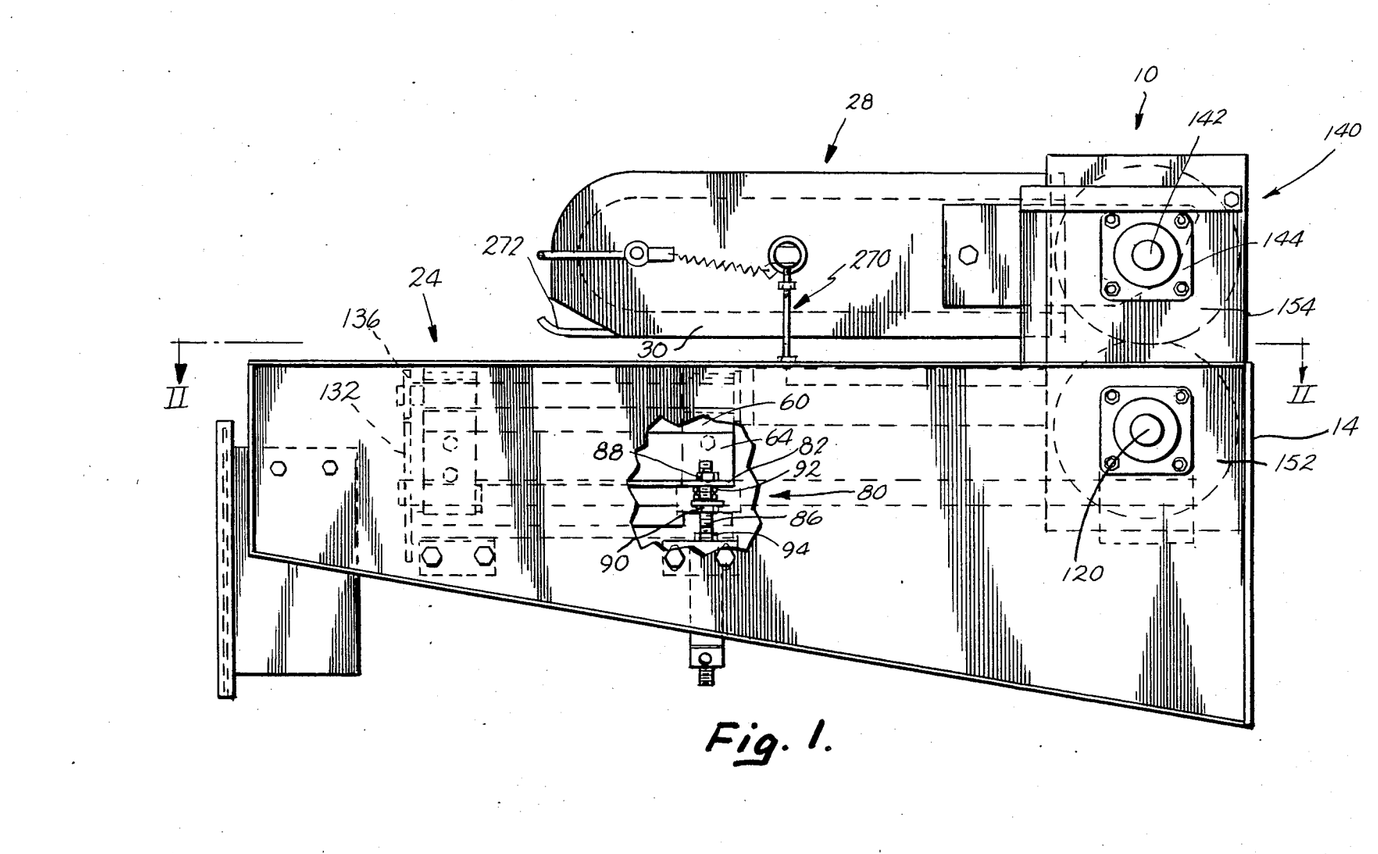
FIG. 1 is a side, elevational view of a poultry skinning apparatus in accordance with the present invention.
Figure 2:
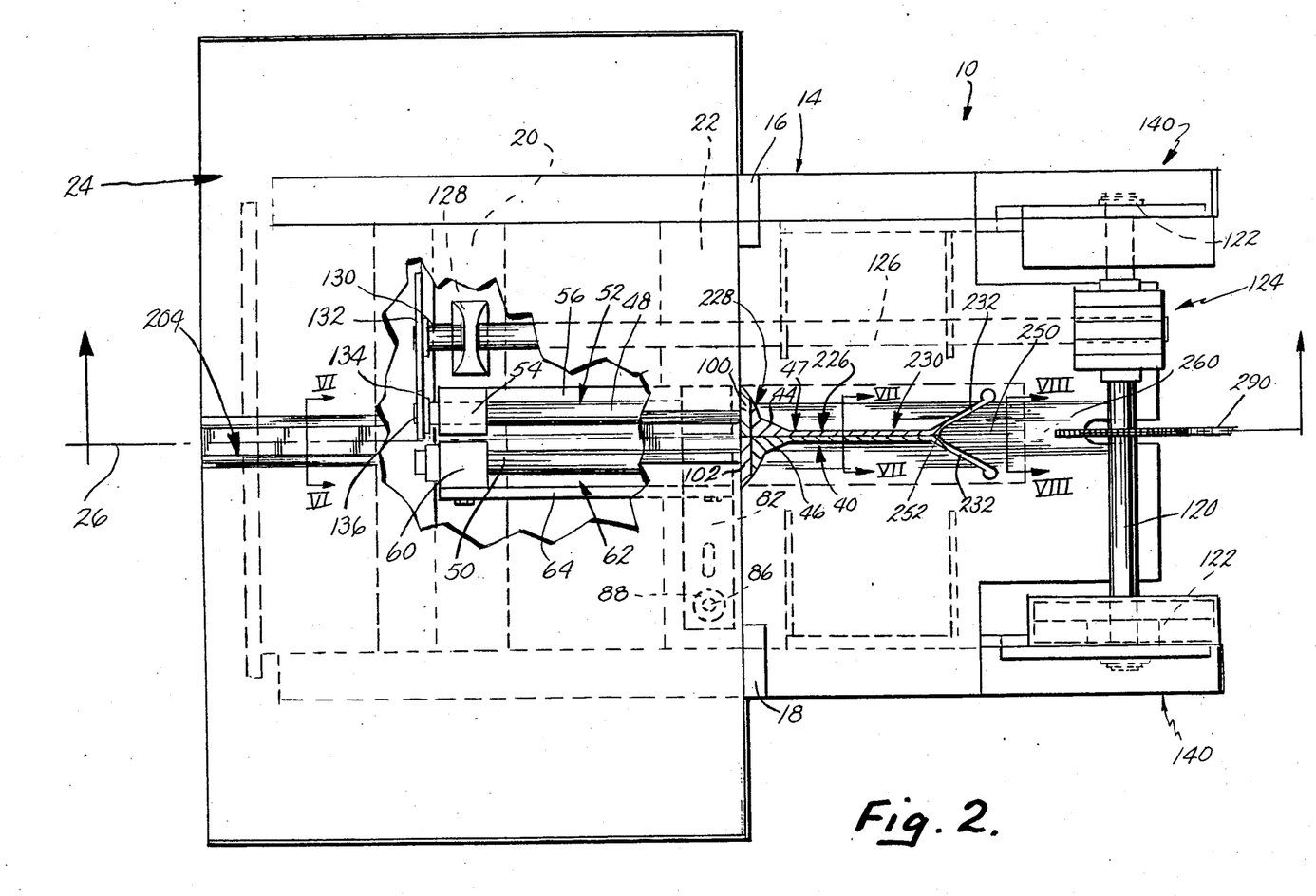
FIG. 2 is a top, plan view of the poultry skinning apparatus of FIG. 1 taken generally along line II—II thereof.
Figure 3:
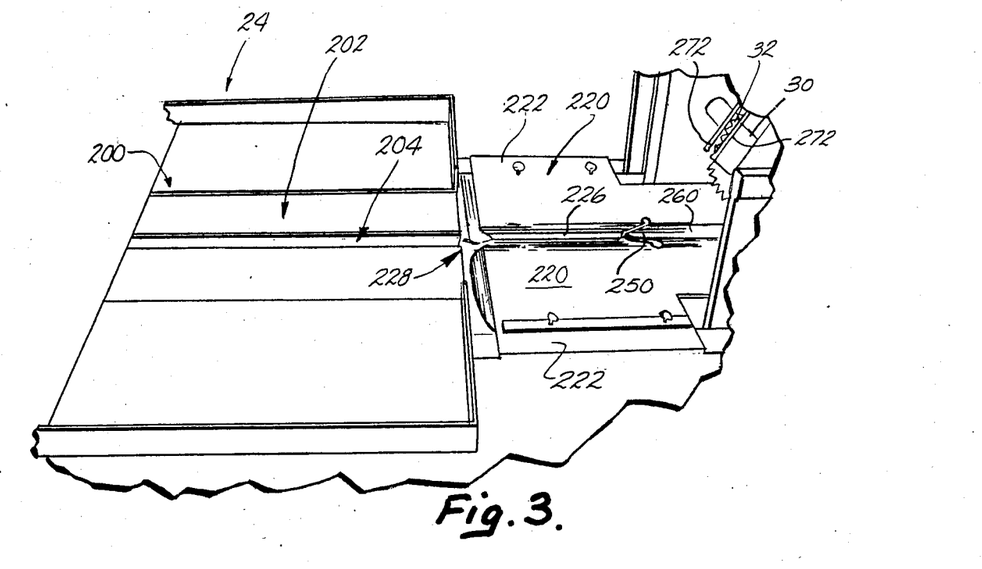
FIG. 3 is a fragmentary, perspective view of the poultry skinning apparatus showing the table thereof.
Figure 4:
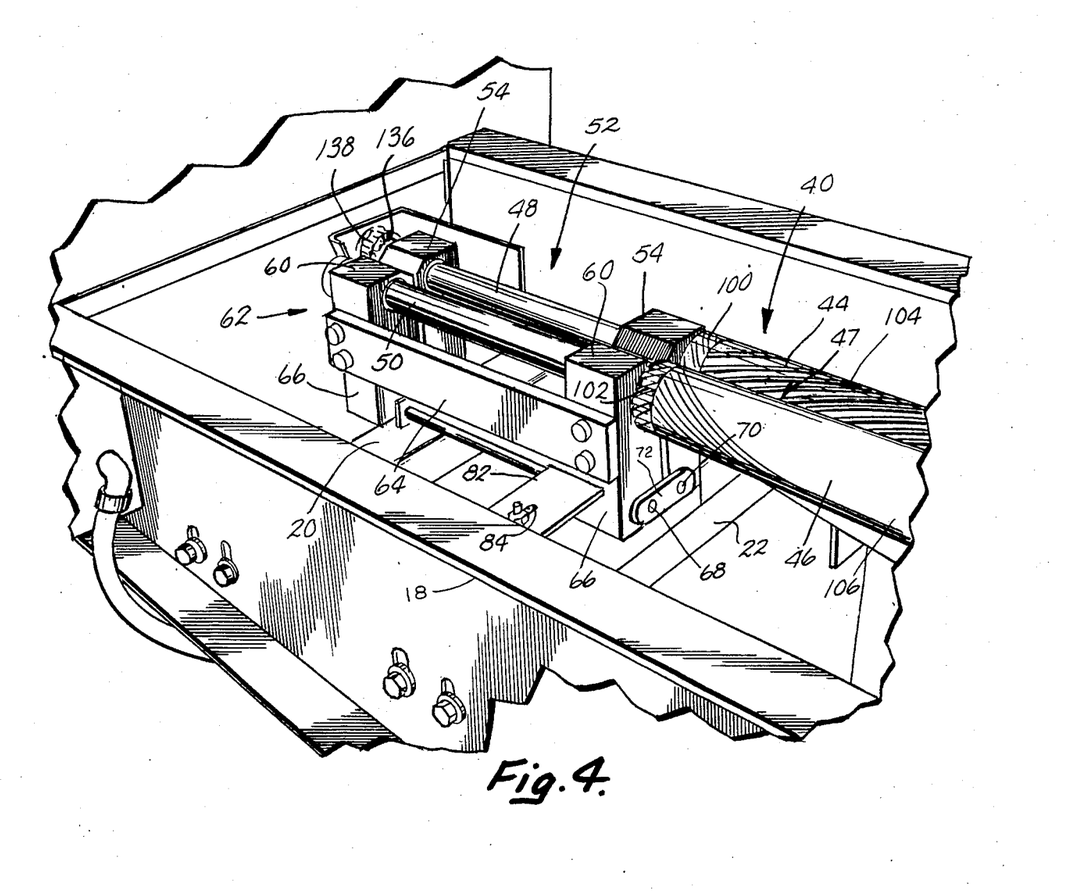
FIG. 4 is a fragmentary, perspective view showing the counter-rotating rolls and the support structure therefor.

A poultry skinning apparatus in accordance with the present invention is illustrated in FIGS. 1 and 2 and generally designated by the numeral 10. Apparatus 10 includes a main frame generally designated 14. Frame 14 includes side members 16, 18 and cross pieces 20, 22. Supported on frame 14 is a support surface or table 24. Table 24 defines a longitudinal axis 26. Positioned above table 24 and extending along longitudinal axis 26 is an elongated conveyor 28. Conveyor 28 is conventional and includes a guide bar 30 supporting a conveyor chain 32 (FIG. 3). As best seen in FIGS. 2 and 4, apparatus 10 includes a skinning means generally designated 40. Skinning means 40 includes a support subassembly 42.

SKINNING MEANS

Skinning means 40 includes a pair of counter-rotating rollers or gears 44, 46. Rollers 44, 46 are helically cut and intermesh so that rotation of roller 44 results in counter-rotation of roller 46. Rollers 44, 46 extend in parallel relationship and define a nip 47. Rollers 44, 46 include elongated shafts 48, 50, respectively. Shaft 48 is supported by a support subassembly 52. Shaft 48 is supported by vertical end members 54. Members 54 are connected by a side member 56. Members 54 are secured to the cross pieces 20, 22 of the main frame 14.

Shaft 50 is rotatably supported by end members 60 of a second support subassembly 62. End members 60 are connected by a side piece 64. Lower ends 66 of end members 60 are pivoted to the fixed support subassembly 52. As seen in FIG. 4, an elongated pivot pin 68 extends between and through end members 60. A pivot pin 70 extends through end members 54 of the fixed subassembly 52. The pivot pins are interconnected by links 72.

Subassembly 62 may be adjusted towards and away from fixed subassembly 52 about the pivot pins 68, 70. As seen in FIG. 1 an adjustment means 80 includes a plate 82 which is fixed to one of the end members 60 and extends outwardly therefrom. Plate 82 defines an aperture or slot 84. Extending through slot 84 is a threaded rod 86. Threaded to rod 86 above plate 82 is an adjustment nut 88. Threaded to rod 86 below plate 82 is an adjustment nut 90. Interposed between an upper surface of nut 90 and a lower surface of plate 82 is a spring 92. A lower end of rod 86 includes a stop 94 which rests on the upper surface of cross piece 22. Spring 92 biases the gears together in a resilient fashion.

As best seen in FIGS. 2 and 4, each roller 44, 46 includes an initial portion 100, 102, respectively, which is cut in a direction opposite to the remaining portions 104, 106, respectively, of the rollers. As explained in more detail below, the reversed cut portions 100, 102 initially engage the skin and begin pulling the skin from the poultry part.

DRIVE MECHANISM

As seen in FIGS. 1 and 2, main frame 14 supports a transverse shaft 120 in end bearing assemblies 122. A gear box 124 supports an elongated shaft 126 which extends parallel to longitudinal axis 26 and is supported in an end bearing 126. Secured to an end 130 of shaft 128 is a sprocket 132. Secured to an end 134 of shaft 48 of roller 44 is a sprocket 136. Sprockets 132, 136 are interconnected by a roller chain 138 (FIG. 4). Shaft 120 rotates shaft 126 through gear box 124. This in turn rotates the helically cut rollers 44, 46.

Figure 5:
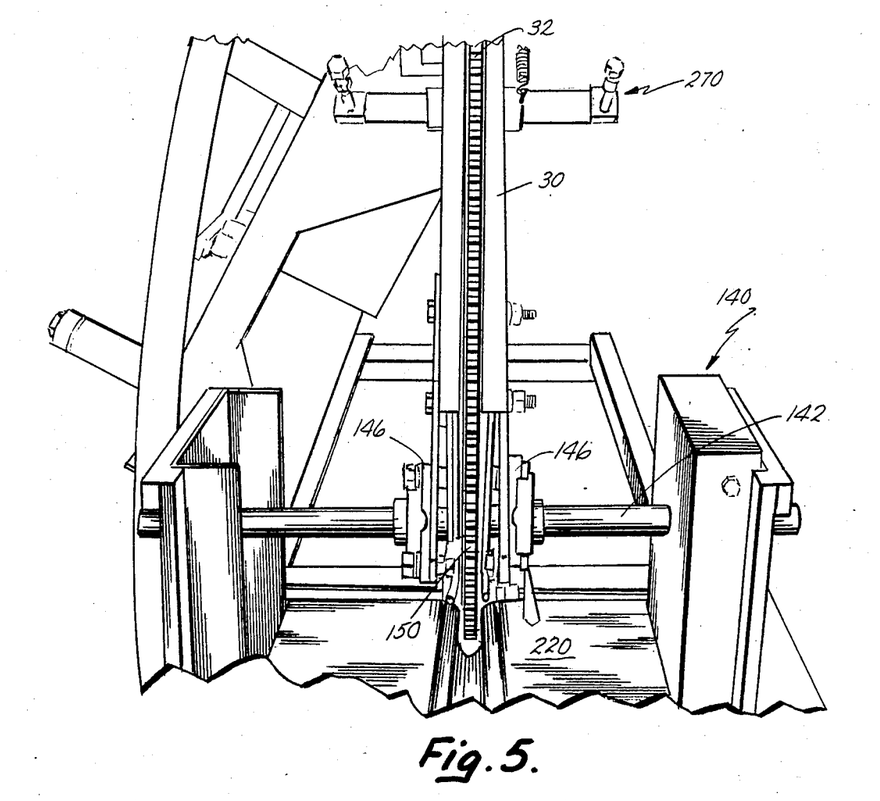
FIG. 5 is a fragmentary, front end, perspective view showing the conveyor rotated to the inoperative position.

As seen in FIGS. 1 and 2, frame 14 at its discharge end supports a pair of housing subassemblies 140. Extending between housing subassemblies 140 is a transverse conveyor drive shaft 142. Shaft 142 is supported in end bearing assemblies 144. Bar 30 of conveyor 28, as seen in FIG. 5, is secured to bearing subassemblies 146. Nonrotatably secured to shaft 142 is a drive sprocket 150 which engages the conveyor chain 32. As a result of this mounting arrangement, conveyor subassembly 28 may be pivoted about shaft 142 to an inoperative position to provide ready access to the other operative portions of the skinning apparatus. Also, the weight of the conveyor will hold the poultry part in engagement with the skinning means. Shaft 142 is driven by gears 152, 154. Gear 152 is nonrotatably secured to shaft 120, and gear 154 is secured to shaft 142. A common drive motor, therefore, is used to operate the conveyor and the skinner rollers.

SUPPORT TABLE

Figure 6:
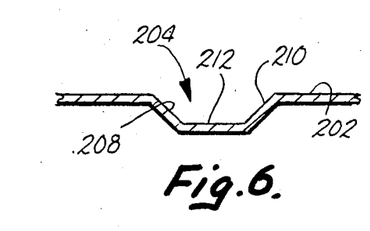
FIG. 6 is a cross-sectional view taken generally along line VI—VI of FIG. 2.
Figure 7:
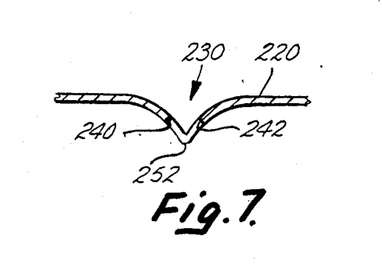
FIG. 7 is a cross-sectional view taken generally along line VII—VII of FIG. 2.
Figure 8:
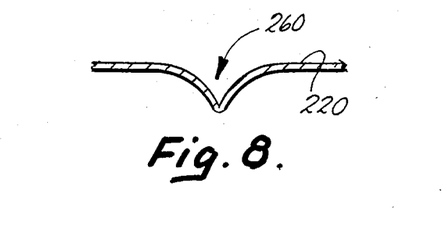
FIG. 8 is a cross-sectional view taken generally along line VIII'VIII of FIG. 2.
Figure 9:
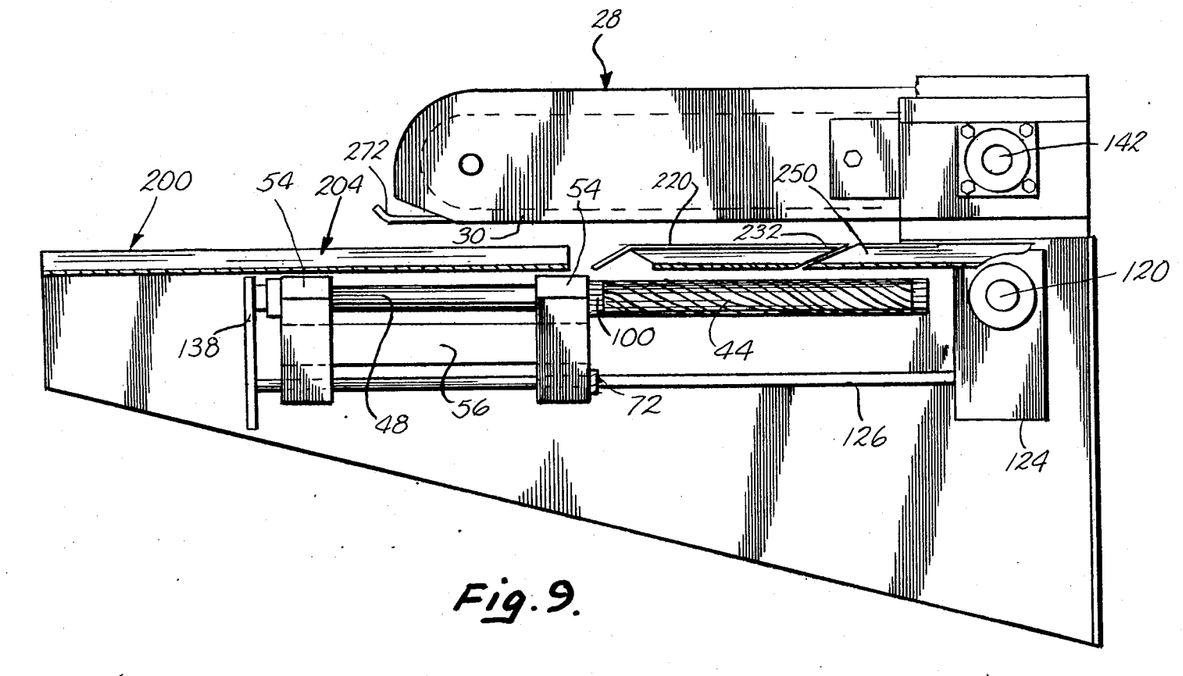
FIG. 9 is a side, elevational cross-sectional view taken generally along the line IX—IX of FIG. 2.

The support table 24 is best seen in FIGS. 2 and 3. Table 24 includes a stationary loading table portion 200. Portion 200 is defined by a plate which extends across and is secured to side members 16, 18. Table 24 further includes an infeed table portion 202. Table portion 202 may be a separate plate carried by plate 200. Portion 202 defines an elongated infeed groove 204. Groove 204 extends along longitudinal axis 26 of apparatus 10. As seen in FIGS. 2 and 6, groove 204 has a generally channel-shape or a truncated V-shape in cross section. Groove 204 includes sidewalls 208, 210 and a base 212. Groove 204 receives a portion of the poultry part or chicken thigh as it is fed along longitudinal axis 26 by conveyor 28. Downstream of groove 204 is an adjustable skinning portion or plate 220. Plate 220 includes sides 222 which are adjustably secured to side members 16, 18. Plate 220 may be moved along the frame members towards and away from groove 204. Plate 220 is moved forward to accommodate smaller poultry pieces and rearwardly towards the discharge end of the apparatus to accommodate larger poultry pieces. Plate 220 defines an elongated slot 226. Slot 226 includes an enlarged entry portion 228, an elongated central portion or leg 230 and angled portions or angled arms 232. Slot 226 has a generally Y-shape when viewed in plan, as shown in FIG. 2 with portion 230 of the slot defining the leg of the Y and angled portions 232 defining the arms of the Y. Enlarged entry portion 228 of slot 226 overlies the forward portions of rollers 44, 46. As shown in FIG. 7, elongated portion 230 of the slot has a generally truncated V-shape in transverse cross section. Edges 240, 242 which define slot portion 230 are spaced equally from the nip defined by the helically cut rollers Slot portion 230 defines a support surface for the poultry part as it passes over and in engagement with the rollers. The slot limits the area of contact of the skin with the rollers. Arms 232 of slot 226 define or are boundaries for a spear 250. Spear 250 is generally triangular in plan, as seen in FIG. 2. Spear 250 includes an apex 252 which s at and coaxially aligned with the centerline or longitudinal axis 26 of apparatus 10. Spear 250 and plate 220 define a groove 260 which extends from apex 252 towards the discharge end of apparatus 10. As seen in FIG. 8, groove 260 is generally V-shaped in transverse cross section.

OPERATION

In operation, conveyor 28 is lowered to the operative position shown in FIG. 1. The position of the lower run of the conveyor may be adjusted relative to the upper surface of table 24 by a threaded adjustment rod nut subassembly 270. Preferably, means are provided for maintaining the lower run of the conveyor parallel with the upper surface of the table during this adjustment. As seen in FIGS. 1 and 3, conveyor 28 may include spaced, parallel, longitudinally extending guide rods 272 which extend from the infeed of conveyor 28 to the discharge end thereof.

The chicken thigh is loaded into the apparatus with the small knuckle forward and the skin down against the surface of table infeed portion 202. The central longitudinally extending area of the thigh is disposed within elongated infeed groove 204. The lower run of the conveyor chain 32 engages the upper surface of the thigh with the knuckle positioned between the guide bars 272. Conveyor 28 moves the chicken part through the machine to the entry portion 228 of slot 226. At this point, the skin is initially engaged by the reverse helical cut portions 100, 102 of rollers 44, 46. These portions initially pull the skin away from the meat. As the conveyor moves the part along slot portion 230, helically cut portions 104, 106 of the rollers pull or tear the skin from the meat. Any loose portions of the skin which are not removed by the rollers are removed when the thigh is brought into contact with and across the upper surface of spear 250. Conveyor 28 then moves the deskinned chicken part to the discharge end of apparatus 10.

Apparatus 10, schematically illustrated in FIG. 2, may be secured to the infeed end of other poultry processing equipment, such as a thigh deboner. When so positioned, conveyor 28 would automatically transfer the deskinned thigh to a feed conveyor 290, as schematically shown in FIG. 2.

The apparatus in accordance with the present invention efficiently removes skin from poultry parts such as chicken thighs. The table or support surface 24 including the infeed slot 204 and the skinning groove 226 insures that the part is properly positioned and held in engagement with the skinning rollers. Spear 250 defined by the skinning portion 220 insures that loose skin is completely removed from the thigh part. The table surface is adjustable to accommodate different size poultry parts. The conveyor structure may be pivoted up and away from the surface 24 to an inoperative position. Table portions 200, 202, 220 are then readily removed from main frame 14. This provides easy access to the rollers and support assemblies for maintenance.

In view of the foregoing description, those of ordinary skill in the art may envision various modifications to the subject invention which would not depart from the inventive concepts disclosed herein. It is, therefore, expressly intended that the above description should be considered as only that of the preferred embodiment. The true spirit and scope of the present invention may be determined by reference to the appended claims.

The embodiments of the invention in which an exclusive property or privilege is claimed are defined as follows.

1. An apparatus for removing the skin from the meat of a poultry part such as a chicken thigh, said apparatus comprising:
   a main frame;
   a support plate adjustably positioned on said frame, said support plate defining an elongated, generally Y-shaped slot having a leg and angled arms, said slot arms bounding a spear portion, said support plate further defining a groove extending along said spear portion;
   a conveyor supported on said frame above said support and extending along said slot and said groove; and
   skinning means on said frame and extending beneath said support plate along said slot for removing the skin from a poultry part as it is moved along said slot by said conveyor, said spear portion of said support plate removing any loose skin not removed by said skinning means.

2. An apparatus as defined by claim 1 further including:
   pivot means for pivotally mounting said conveyor to said frame at a rearward end thereof so that the conveyor presses the poultry part into engagement with said skinning means.

3. An apparatus as defined by claim 1 wherein said skinning means comprises:
   a pair of elongated, counter-rotating spiral cut gears positioned in parallel relationship to define a nip, said nip extending along said slot defined by said support; and
   a support assembly on said frame, said support assembly including means for adjusting the intermeshing of said gears and for resiliently biasing said gears towards each other.

4. An apparatus as defined by claim 3 wherein each of said spiral cut gears includes a forward portion having a spiral direction which is reversed from the spiral direction along the remaining portion of the gear, said forward portions initially engaging the skin to start pulling the skin from the poultry part.

5. An apparatus as defined by claim 2 wherein said skinning means comprises:
   a pair of elongated, counter-rotating spiral cut gears positioned in parallel relationship to define a nip, said nip extending along said slot defined by said support; and
   a support assembly on said frame, said support assembly including means for adjusting the intermeshing of said gears and for resiliently biasing said gears towards each other.

6. An apparatus as defined by claim 5 wherein each of said spiral cut gears includes a forward portion having a spiral direction which is reversed from the spiral direction along the remaining portion of the gear, said forward portions initially engaging the skin to start pulling the skin from the poultry part.

7. An apparatus as defined by claim 3 wherein said support assembly comprises:
   a first support fixed to said main frame, said first support rotatably supporting one of said spiral cut gears;
   a second support rotatably supporting the other of said spiral cut gears; and
   linkage means connected to said supports for allowing pivotal movement of said supports towards and away from each other.

8. An apparatus as defined by claim 7 wherein said means for adjusting comprises:
   an adjustment plate extending outwardly from and fixed to said second support;
   a threaded shaft having a lower end engaging said main frame and an upper portion passing through said adjustment plate;
   a pair of nuts threaded to said shaft on opposite sides of said adjustment plate; and
   a spring positioned between a lower surface of said adjustment plate and one of said nuts.

9. An apparatus as defined by claim 5 wherein said support assembly comprises:
   a first support fixed to said main frame, said first support rotatably supporting one of said spiral cut gears;
   a second support rotatably supporting the other of said spiral cut gears; and
   linkage means connected to said supports for allowing pivotal movement of said supports towards and away from each other.

10. An apparatus as defined by claim 9 wherein said means for adjusting comprises:
   an adjustment plate extending outwardly from and fixed to said second support;
   a threaded shaft having a lower end engaging said main frame and an upper portion passing through said adjustment plate;
   a pair of nuts threaded to said shaft on opposite sides of said adjustment plate; and
   a spring positioned between a lower surface of said adjustment plate and one of said nuts.

11. A chicken thigh skinner comprising:
   an elongated table having a feed end, a discharge end and a longitudinal axis, said table defining a skinning portion which is adjustable along said longitudinal axis to accommodate different size thighs, said skinning portion defining an elongated slot extending along said axis and said skinning portion further defining a spear having a generally triangular shape in plan and an apex at a discharge end of said slot, said spear removing loose skin from said thigh which is not removed by said rollers;
   a pair of counter-rotating, spiral cut skinning rollers which are intermeshed to define a nip, said rollers extending parallel to each other with said nip extending in juxtaposed relationship with said slot;
   drive means operatively connected to said rollers for rotating said rollers;
   support means connected to said rollers for supporting said rollers adjacent said table; and
   a conveyor supported by said table and extending along and spaced from said slot and said nip for moving a thigh along said slot and for holding the thigh in engagement with said rollers.

12. A chicken thigh skinner as defined by claim 11 wherein said adjustable skinning portion of said table defines a groove which extends along said longitudinal axis from said spear apex towards said discharge end of said table.

13. A chicken thigh skinner as defined by claim 12 wherein said groove is generally V-shaped in transverse cross section, and said slot has a generally truncated V-shape in transverse cross section.

14. A chicken thigh skinner as defined by claim 12 wherein said elongated table defines a feed groove extending from said feed end along said longitudinal axis, said feed groove being aligned with said slot.

15. A chicken thigh skinner as defined by claim 14 wherein said feed groove is generally channel-shaped in transverse cross section.

16. A chicken thigh skinner as defined by claim 13 wherein said elongated table defines a feed groove extending from said feed end along said longitudinal axis, said feed groove being aligned with said slot.

17. A chicken thigh skinner as defined by claim 16 wherein said feed groove is generally channel-shaped in transverse cross section.

18. A chicken thigh skinner as defined by claim 11 wherein said elongated slot has an enlarged, generally V-shape in plan entrance portion.

19. A chicken thigh skinner as defined by claim 17 wherein said elongated slot has an enlarged, generally V-shape in plan entrance portion.

20. A chicken thigh skinner as defined by claim 11 wherein said counter-rotating rollers each include an initial portion having a spiral cut which is reversed in direction from the spiral cut of the remaining portion of said roller.

21. A chicken thigh skinner as defined by claim 20 wherein said support means includes resilient means for biasing said rollers towards each other.

22. A chicken thigh skinner as defined by claim 21 further including pivot means for pivotally mounting said conveyor to said table adjacent the discharge end of said table.

23. A chicken thigh skinner as defined by claim 19 wherein said counter-rotating rollers each include an initial portion having a spiral cut which is reversed in direction from the spiral cut of the remaining portion of said roller.

24. A chicken thigh skinner as defined by claim 23 wherein said support means includes resilient means for biasing said rollers towards each other.

25. A chicken thigh skinner as defined by claim 24 further including pivot means for pivotally mounting said conveyor to said table adjacent the discharge end of said table.

* * * * *

UNITED STATES PATENT AND TRADEMARK OFFICE
CERTIFICATE OF CORRECTION

PATENT NO. : 4,697,307

DATED : October 6, 1987

INVENTOR(S) : Martin et al

It is certified that error appears in the above-identified patent and that said Letters Patent is hereby corrected as shown below:

Column 2, line 49:
"VIII'VIII" should be --VIII-VIII--;

Column 4, line 39:
After "rollers" insert --.--; and

Column 4, line 45:
"s" should be --is--.

Signed and Sealed this

Fifteenth Day of March, 1988

Attest:

DONALD J. QUIGG

Attesting Officer     Commissioner of Patents and Trademarks